United States Patent
Jacobson et al.

(10) Patent No.: US 10,705,825 B2
(45) Date of Patent: Jul. 7, 2020

(54) CREATION OF IMAGES

(71) Applicant: Hewlett Packard Enterprise Development LP, Houston, TX (US)

(72) Inventors: Erik Daniel Jacobson, Eagan, MN (US); Corneliu Mihai Boac, Eagan, MN (US)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 0 days.

(21) Appl. No.: 16/137,253

(22) Filed: Sep. 20, 2018

(65) Prior Publication Data

US 2020/0097276 A1    Mar. 26, 2020

(51) Int. Cl.
| | |
|---|---|
| *G06F 8/61* | (2018.01) |
| *G06F 8/65* | (2018.01) |
| *G06F 3/0484* | (2013.01) |
| *H04L 29/08* | (2006.01) |
| *G06F 16/51* | (2019.01) |

(52) U.S. Cl.
CPC ............ *G06F 8/65* (2013.01); *G06F 3/04845* (2013.01); *G06F 8/61* (2013.01); *H04L 67/141* (2013.01); *G06F 16/51* (2019.01)

(58) Field of Classification Search
CPC .................................. G06F 3/048; G06F 8/61
USPC .......................................................... 715/735
See application file for complete search history.

(56) References Cited

U.S. PATENT DOCUMENTS

| | | | | |
|---|---|---|---|---|
| 5,930,513 | A * | 7/1999 | Taylor ....................... | G06F 8/61 717/174 |
| 7,376,945 | B1 * | 5/2008 | Kakumani ............ | G06F 9/4416 717/171 |
| 7,467,324 | B1 * | 12/2008 | Davda ................. | G06F 11/0715 711/162 |
| 8,239,662 | B1 * | 8/2012 | Nelson .................. | G06F 9/4416 713/1 |
| 8,276,132 | B1 * | 9/2012 | Vanderspek .............. | G06F 8/30 717/138 |

(Continued)

OTHER PUBLICATIONS

Kaspersky Lab, "Quickstart Guide: Systems Imaging", available at <https://media.kaspersky.com/en/business-security/eval/KasperskyLabQuickStartGuide-SystemsImagingGuide.pdf>, archived on Jan. 22, 2016 at wayback machine <http://web.archived.org>, 35 pages (Year: 2016).*

(Continued)

*Primary Examiner* — Daniel Rodriguez
(74) *Attorney, Agent, or Firm* — Tong, Rea, Bentley & Kim, LLC (57) ABSTRACT

In example implementations, an apparatus is provided. The apparatus includes a processor, an image creation tool, an operating system (OS) image repository and a secondary node interface. The processor has a first architecture and is in communication with the image creation tool, the OS image repository, and the secondary node interface. The image creation tool is to create an OS image for end nodes having the first architecture. The OS image repository is to store OS images. The secondary node shell is to provide an interface to a secondary node with a processor having a second architecture. An OS image for end nodes having the second architecture is created by the secondary node via the secondary node interface.

21 Claims, 4 Drawing Sheets

(56) References Cited

U.S. PATENT DOCUMENTS

| | | | | |
|---|---|---|---|---|
| 8,713,135 B1* | 4/2014 | Adogla | ............... | H04L 41/0853 709/220 |
| 2003/0023839 A1* | 1/2003 | Burkhardt | ................. | G06F 8/63 713/1 |
| 2003/0069951 A1* | 4/2003 | Fong | ....................... | H04L 29/06 709/222 |
| 2003/0131148 A1* | 7/2003 | Kelley | ....................... | G06F 8/20 719/321 |
| 2005/0027831 A1* | 2/2005 | Anderson | ................. | G06F 8/63 709/220 |
| 2006/0059555 A1* | 3/2006 | Holladay | ................. | G06F 21/57 726/22 |
| 2007/0157196 A1* | 7/2007 | Goicea | ..................... | G06F 8/60 717/174 |
| 2007/0239978 A1* | 10/2007 | Bharathy | ............. | G06F 9/4416 713/2 |
| 2007/0294332 A1* | 12/2007 | Karki | ........................ | G06F 8/60 709/203 |
| 2008/0046708 A1* | 2/2008 | Fitzgerald | ................. | G06F 8/63 713/2 |
| 2011/0066879 A1* | 3/2011 | Nakai | ....................... | G06F 8/63 714/6.2 |
| 2012/0023222 A1* | 1/2012 | Campion | ............... | G06F 9/5072 709/224 |
| 2012/0042195 A1* | 2/2012 | Marinelli | ............ | G06F 11/0712 714/3 |
| 2013/0007727 A1* | 1/2013 | Donatelli | ................... | G06F 8/63 717/177 |
| 2013/0198354 A1* | 8/2013 | Jones | ..................... | G06F 9/5072 709/223 |
| 2013/0212161 A1* | 8/2013 | Ben-Shaul | ............ | G06F 16/178 709/203 |
| 2014/0053150 A1* | 2/2014 | Barnett | ..................... | G06F 9/455 718/1 |
| 2014/0101425 A1* | 4/2014 | Walters | ..................... | G06F 9/00 713/2 |
| 2014/0181490 A1* | 6/2014 | Campbell | ............. | G06F 9/4406 713/2 |
| 2015/0268965 A1 | 9/2015 | Gschwind | | |
| 2016/0162279 A1* | 6/2016 | Zamir | ....................... | G06F 8/65 717/170 |
| 2016/0203000 A1* | 7/2016 | Parmar | ................. | G06F 9/4416 713/2 |
| 2017/0116029 A1 | 4/2017 | Azam et al. | | |
| 2017/0237560 A1* | 8/2017 | Mueller | .................... | H04L 9/30 713/168 |
| 2018/0052675 A1* | 2/2018 | Ghosh | ................. | G06F 11/3604 |
| 2018/0173529 A1* | 6/2018 | Tamir | .................... | G06F 9/3009 |
| 2018/0173675 A1* | 6/2018 | Tamir | ...................... | G06F 15/80 |
| 2018/0322090 A1* | 11/2018 | Tamir | .................... | G06F 9/4856 |
| 2019/0050270 A1* | 2/2019 | Tamir | ................. | G06F 9/45533 |

OTHER PUBLICATIONS

Phil Estes, Multi-arch All the Things, Docker Blog, Nov. 2017, downloaded from https://blog.docker.com/2017/11/multi-arch-all-the-things/, 6 pages.

* cited by examiner

CREATION OF IMAGES

BACKGROUND

A network of servers may be deployed to provide clusters of shared processors that can be used to execute different software applications or job requests. The clusters can be managed by a head node. The head node may manage assignment of clusters of processors to execute various different job requests.

As processing jobs change and become more demanding, different servers may be deployed. For example, the architecture of the processors in the servers may change or be different. In some examples, the processors may have an x86 architecture, an aarch64 architecture, and the like.

DETAILED DESCRIPTION

Examples described herein provide a system and method to generate operating system (OS) images in a multi-architecture system. As discussed above, networks of servers may be deployed with servers having processors with different hardware architectures. For example, the servers may be deployed initially with x86 processors. However, new servers may be added to the network that have aarch64 processors, or another type of architecture. In a multi-architecture network, a head node may be unable to generate an OS image for servers that have different processor architectures.

The present disclosure provides a system that provides a secondary node or a helper node. The secondary node may help the head node to provide seamless centralized management of a cluster of end nodes even if the end nodes in the cluster have a mix of different architectures.

The secondary node may have a processor that is similar to the architecture of the servers with the different architecture. For example, in a network with x86 and aarch64 processors, if the head node has an x86 architecture, the secondary node may have an aarch64 architecture. The head node may detect when an OS image creation request is for an aarch64 architecture and pass the request to the secondary node. The secondary node may create the OS image and transmit the OS image back to the head node. The head node may store the OS image, distribute the OS image to the appropriate end nodes, and install the OS image on the appropriate end nodes.

Figure 1:
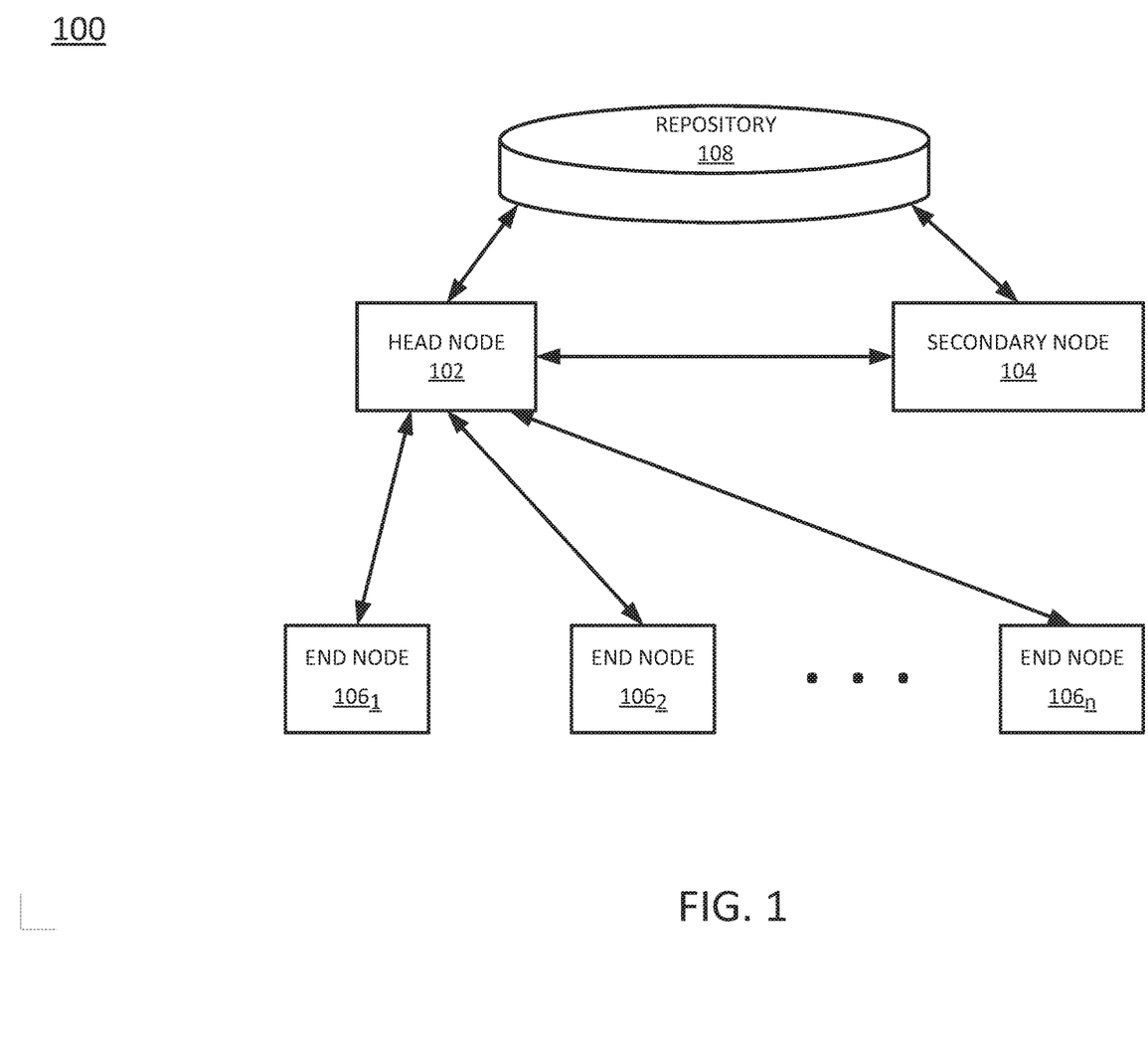
FIG. 1 is a block diagram of an example network of the present disclosure.

FIG. 1 illustrates a network 100 of the present disclosure. In one example, the network 100 may include a head node 102, a secondary node 104, a plurality of end nodes $106_1$ to $106_n$ (also herein referred to individually as an end node 106 or collectively as end nodes 106), and a repository 108. In one example, the head node 102 may be communicatively coupled to the end nodes 106 via a wired or wireless connection. The head node 102 may also be communicatively coupled to the secondary node 104 via a wired or wireless connection.

In one example, the secondary node 104 may be isolated from the end nodes 106. In other words, the secondary node 104 may not be directly connected to, or in communication with, the end nodes 106 in the network 100. In one example, the head node 102, the secondary node 104, and the end nodes 106 may communicate via an Internet protocol (IP). In other words, the network 100 may be an IP network.

In one example, the repository 108 may be a networked storage device database, and the like. The repository 108 may include a memory to store files, OS images, and the like. Although the repository 108 is shown as a separate device, it should be noted that the repository 108 may be part of local memory that is part of the head node 102. The head node 102 and the secondary node 104 may access files in the repository 108 via the network 100.

It should be noted that the network 100 has been simplified for ease of explanation. The network 100 may include additional network elements that are not shown. For example, the network 100 may include a firewall, a router, a gateway, storage databases, and the like. In addition, the head node 102, the secondary node 104, and the end nodes 106 may be at a common location, or may be distributed throughout different locations (e.g., different buildings, different geographic locations, and the like).

In one example, the end nodes 106 may be servers having a processor and a memory. In one example, the end nodes 106 may have a processor with a particular type of architecture that is compatible with a particular type of operating system (OS). When referring to an "architecture" of an end node 106, the "architecture" may be referring to the type of processor in the end node 106. The end nodes 106 may have the same architecture or may have different architectures. Examples of different types of architecture may include an x86 processor architecture, an aarch64 processor architecture, and the like.

In one example, the head node 102 may also include a processor with a particular type of architecture. The head node 102 may manage and monitor the end nodes 106. The head node 102 may monitor operation of the end nodes 106 and manage installing software, updates, and the like for the end nodes 106.

When the architecture of the head node 102 is the same as the architecture of an end node 106, the head node 102 may seamlessly update and install new software onto the end node 106. For example, if a new end node 106 is installed and has the same architecture as the head node 102, the head node 102 may create an OS image for the new end node 106. The new end node 106 may receive the OS image and install the OS image on the new end node 106.

In one example, an OS image may be a file or executable software. The OS image may be a tree of directories that includes files for installing the OS onto the end node 106. The repository 108 may store files used to create the OS images and/or previously created OS images.

However, when the head node 102 and the end node 106 have different architectures, the head node 106 may have difficulty in installing or updating software on the end node 106. For example, the head node 106 may have an x86 architecture and a new end node 106 may have an aarch64 architecture. Thus, the head node 102 may be unable to create an OS image that is compatible with the aarch64 architecture of the new end node 106.

The present disclosure provides the secondary node 104 that may assist in creating an OS image for an end node 106 that may have a different architecture than the head node 102. For example, if the end node 106 has an aarch64 architecture, the secondary node 104 may also have the aarch64 architecture.

The head node 102 may activate or connect to the secondary node 104 when a request to generate an OS image is for an end node 106 with a different architecture. A user may interact with the head node 102 while the secondary node 104 operates transparently to the user. For example, the head node 102 may provide an interface that appears to the user that the OS image is being created in the head node 102, even though the OS image is being created in the secondary node 104. The user may provide commands and/or instructions in the interface of the head node 102 to create the OS image. It may appear that the user is interacting with the head node 102 although the commands and/or instructions are passed to the secondary node 104 and executed by the secondary node 104 to generate the OS image.

The interface may be a graphical user interface, a command prompt, a command line interface, and the like within a shell displayed by the head node 102. For example, the user may initiate creation of the OS image on the head node 102 by providing a list of packages and/or files to be installed to create the OS image. The packages and/or files may be stored in the repository 108 and accessed by the head node 102 and/or secondary node 104 during the OS image creation. The process of the image creation may be started in the head node 102 by way of a package or file list. The files and/or packages are retrieved from the repository 108 to be used for the OS image creation on the secondary node 104 when the OS image is for an end node 106 with a different architecture.

The user may issue commands within the interface on the head node 102. The commands may be transmitted to the secondary node 104. For example, the user may "change root" or "chroot" the image on the head node 102 for the different architecture. The user may believe he or she is still operating against the OS image in the head node 102 via the interface. The user may then install packages, files, and the like into the OS image for the different architecture associated with the end node 106 via the interface, which is performed on the secondary node.

Once the OS image is created by the secondary node 104, the OS image can be transmitted to the head node 102. The head node 102 may store the OS image in the repository 108 and also transmit the OS image to the end node 106 to be installed.

As noted above, the interface may also allow a user to update existing OS images. For example, the interface may allow a user to install certain packages and uses commands such as "container" and "chroot" (e.g., change root). These commands may be incompatible with the OS of the head node 102, but the interface may allow the user to use commands that are compatible with the OS of a different architecture. The interface may also provide new commands that can be used such as "NEWchroot," which may allow a user to operate within an OS image on the secondary node 104 even though the user is working on the head node 102. Further details of the update process and new commands are discussed in further details below.

Although FIG. 1 illustrates a single secondary node 104, it should be noted that multiple secondary nodes 104 may be deployed. Each secondary node 104 may have a different architecture be associated with the architecture of an end node 106. For example, if there are three different architectures deployed in the network 100, then two secondary nodes 104 may be deployed such that an OS image can be created for the three different architectures (e.g., one architecture by the head node 102 and the other two architectures by the secondary nodes 104).

Figure 2:
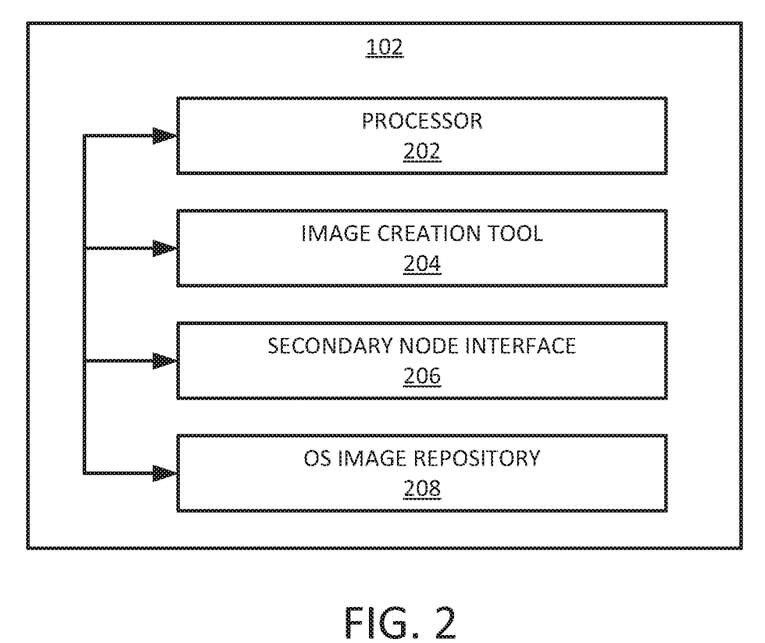
FIG. 2 is a block diagram of an example head node of the present disclosure.

FIG. 2 illustrates an example block diagram of the head node 102. In one example, the head node 102 may include a processor 202, an image creation tool 204, a secondary node shell 206, and an OS image repository 208. In one example, the processor 202 may be communicatively coupled to the image creation tool 204, the secondary node interface 206, and the OS image repository 208.

It should be noted that the head node 102 has been simplified for ease of explanation. The head node 102 may include additional components such as a display, a user interface, input devices (e.g., a keyboard, a mouse, a touchpad, and the like), network interfaces to establish a wired or wireless communication connection to the end nodes 106 and/or the secondary node 104, and the like.

In one example, the image creation tool 204 may be executed by the processor 202 to create an OS image for end nodes 106 that have an architecture that is similar to the architecture of the processor 202 of the head node 102.

In one example, the secondary node interface 206 may generate a GUI, provide a new command line interface within a window or shell, and the like, to allow commands and instructions to be transmitted to the secondary node 104 and executed by the secondary node 104. The interface may be a window displayed by the head node 102 on a display device. The interface may make it appear to the user as if the user is interacting with the head node 102. Thus, the user may use known commands or syntax associated with the head node 102 without knowing that the secondary node 104 is actually executing the commands. In one example, the head node 102 may translate commands into a syntax or protocol that is compatible with the OS or architecture associated with the secondary node 104. Thus, the secondary node interface 206 provides a seamless interface for the user that wants to create or update an OS image for end nodes having a different architecture than the head node 102.

As described above, the processor 202 may analyze a request to generate an OS image and determine that the OS image is for an end node 106 with an architecture that is different than the architecture of the head node 102. For example, the request may include information identifying the OS that is associated with a particular architecture, the request may specify the architecture, and the like.

The processor 202 may then execute the secondary node interface 206 in response to detecting that the OS image in the request is for an end node 106 with an architecture that is different than the architecture of the head node. In addition, the processor 202 may establish a communication session with the secondary node 104. The communication session may allow data to be transmitted between the head node 102 and the secondary node 104 via the GUI generated by the secondary node interface 206.

In one example, the OS image repository 208 may be a portion of a memory or non-transitory computer readable medium of the head node 102. The processor 202 may receive the OS image from the secondary node 104 and store the OS image in the OS image repository 208. Thus, the head node 102 may store all of the OS images in the OS image repository 208 regardless of the architecture associated with the OS image. As a result, the head node 102 may maintain management and installation of the OS images on all of the end nodes 106 regardless of the architecture of the end nodes 106.

When a new end node 106 is deployed in the network 100, the processor 202 may check to see if an OS image for an architecture associated with the new end node 106 is stored in the OS image repository 208. If the OS image exists, the processor 202 may transmit the stored OS image to the new end node 106 to install the OS on the new end node 106.

Figure 3:
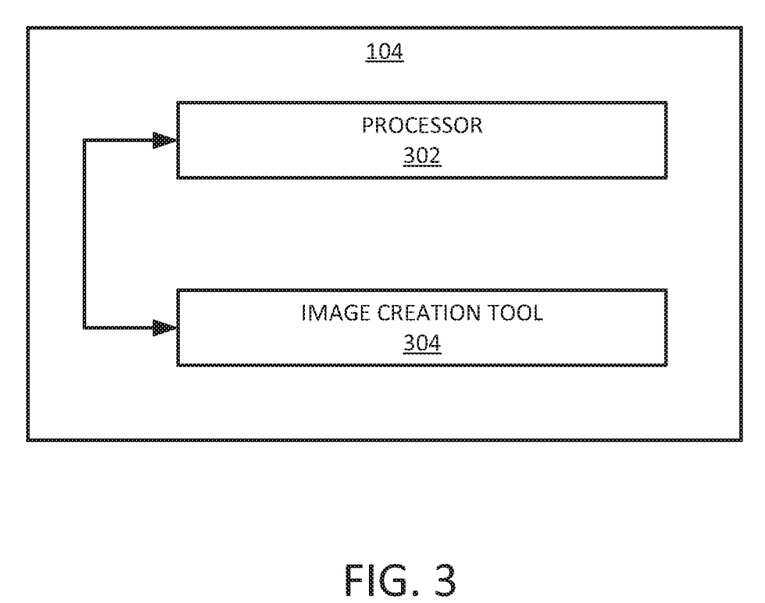
FIG. 3 is a block diagram of an example of a secondary node of the present disclosure.

FIG. 3 illustrates an example block diagram of the secondary node 104. In one example, the secondary node 104 may include a processor 302 and an image creation tool 304. In one example, the processor 302 may be in communication with the image creation tool 304. In one example, the architecture of the processor 302 may be different than the processor 202 of the head node 102, but the same as the processor of an end node 106 in the network 100. For example, the head node 102 may have a processor 202 with a first architecture and the secondary node may have a processor 302 with a second architecture. The first architecture may be different from the second architecture. For example, the first architecture may be x86 and the second architecture may be aarch64.

In one example, the processor 302 may be in communication with the head node 102 via the secondary node interface 206. The processor 302 may receive commands and/or instructions from the head node 102 via the secondary node interface 206. The processor 302 may forward the commands and/or instructions to the image creation tool 304. The image creation tool 304 may execute the commands and/or instructions to generate, or create, an OS image for the end node 106 that has a similar architecture as the secondary node 104 (but different architecture than the head node 102).

The image creation tool 304 may also execute commands and/or instructions to update existing OS images. For example, a user may want to update an OS image stored in the OS image repository that is associated with the architecture of the secondary node 104. The processor 202 may execute the secondary node interface 206 and the user may provide commands and/or instructions to update the OS image.

The commands and/or instructions may be commands such as "container," "chroot," and the like. The instructions may include adding a particular package in the OS image. For example, the OS image may be a file tree directory structure and the commands may allow a user to insert a package or file anywhere in the file tree directory structure.

The commands and/or instructions may be transmitted to the processor 302 and forwarded to the image creation tool 304 for execution. The image creation tool 304 may update the OS image in accordance with the commands and/or instructions and transmit the updated OS image back to the head node 102. The processor 202 of the head node 102 may perform a synch operation to synchronize the stored OS image with the updated OS image that is received from the secondary node 104.

As noted above, the secondary node 104 may be isolated from the end nodes 106. In other words, the secondary node 104 may communicate with the head node 102 and not with the end nodes 106. The secondary node 104 may be "hidden" from the end nodes 106. Thus, the head node 102 may perform management and monitoring of the end nodes 106 irrespective of the type of architecture that is deployed on the end nodes 106. The secondary node 104 may be called upon by the head node 102 to create and update OS images when associated with a different architecture. Thus, the secondary node 104 provides a scalable and adaptable solution to automatically deploying end nodes 106 with different architectures than head node 102.

Figure 4:
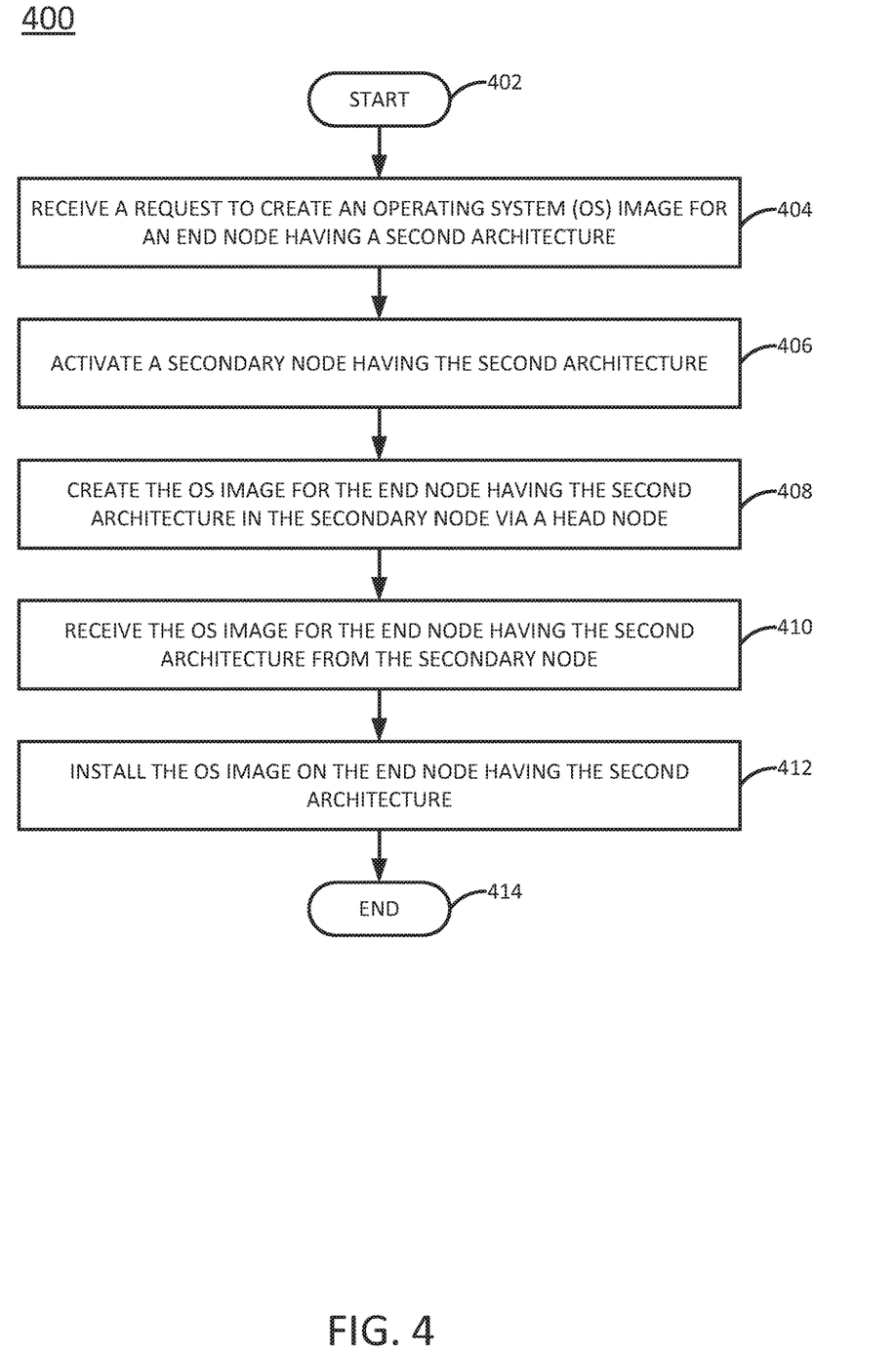
FIG. 4 is a flow chart of an example method for creating an image in a multi-architecture system.

FIG. 4 illustrates a flow diagram of an example method 400 for creating an image in a multi-architecture system. In an example, the method 400 may be performed by the head node 102 or the apparatus 500 illustrated in FIG. 5 and described below.

At block 402, the method 400 begins. At block 404, the method 400 receives a request to create an operating system (OS) image for an end node having a second architecture. The head node having a first architecture may receive the request. The end node may include a processor with a second architecture that is different from the first architecture of the processor of the head node. For example, the head node may have a processor that has an x86 architecture and the end node may have a processor that has an aarh64 architecture.

In one example, when the head node receives the request, the head node may analyze the request to determine an architecture associated with the request. If the request is to create an OS image for an end node that includes a processor with the same first architecture as the head node, then head node may create the OS image on the image creation tool of the head node. However, if the request is to create an OS image for an end node that includes a processor with a different architecture, the head node may pass the request to a secondary node.

In one example, the architecture associated with the request may be determined by looking at repositories that have stored files associated with the request. The architecture can be determined based on the information such as the Linux distribution, version, and architecture of an image given the package repositories of input, information inside the repositories, package naming conventions, and the like.

At block 406, the method 400 activates a secondary node having the second architecture. For example, the head node may initiate or establish a communication session with the secondary node in response to determining that the request is to create an OS image for an end node with the second architecture. The communication session may be a wired or wireless communication session.

At block 408, the method 400 creates the OS image for the end node having the second architecture in the secondary node via the head node. In one example, the head node may execute a secondary node interface such that a user may believe that commands are being entered via the head node. For example, the interface may be a shell that executes on the head node, but transmits commands to the secondary node via the communication session.

In one example, the commands may include commands that would otherwise not be recognized by the OS of the head node using a processor of the first architecture. For example, the secondary node may be used to create OS images for operating systems such as Unix or Linux. The commands may include commands such as "container," "chroot," and the like.

In one example, the GUI may allow a user to modify previously stored OS images. For example, the GUI may allow a user to add particular packages to the OS image using the commands associated with the OS executed by the end node having the processor with the second architecture.

At block 410, the method 400 receives the OS image for the end node having the second architecture from the secondary node. For example, the OS image may be transmitted over the communication session.

At block 412, the method 400 installs the OS image on the end node having the second architecture. For example, the head node may transmit the OS image to the end node and cause the end node to install the OS image. In some examples, the head node may store the OS image in an OS image repository. As a result, the head node may transmit and install the OS image from the OS image repository to other end nodes having the second architecture.

In one example, a user may request to update the OS image. The head node may establish the communication session with the secondary node in response to the update request and execute the GUI, as described above. The user may update the OS image as desired and the secondary node may create an updated OS image.

For example, new commands that allows a user to update the OS image may be used between the head node and the secondary node. For example, a new command such as "NEWchroot" may be used to synchronize a current state of an OS image for the end nodes with a different architecture into the secondary node. The "NEWchroot" command may then do a chroot operation on the secondary node into the OS image. The interface on the head node used to access the secondary node may be executed to provide a shell within the image on the secondary node.

Using the interface, the user may install new files, packages, and the like, to the OS image. The secondary node may update the OS image and the "NEWchroot" command may be exited. Part of the "NEWchroot" command may be to automatically synchronize the OS image. For example, the updated OS image may be transmitted back to the head node via the communication session. The head node may then find the OS image in the OS image repository and synchronize the OS image with the updated OS image. The updated OS image may then be transmitted to the appropriate end nodes to be installed. At block 414, the method 400 ends.

Figure 5:
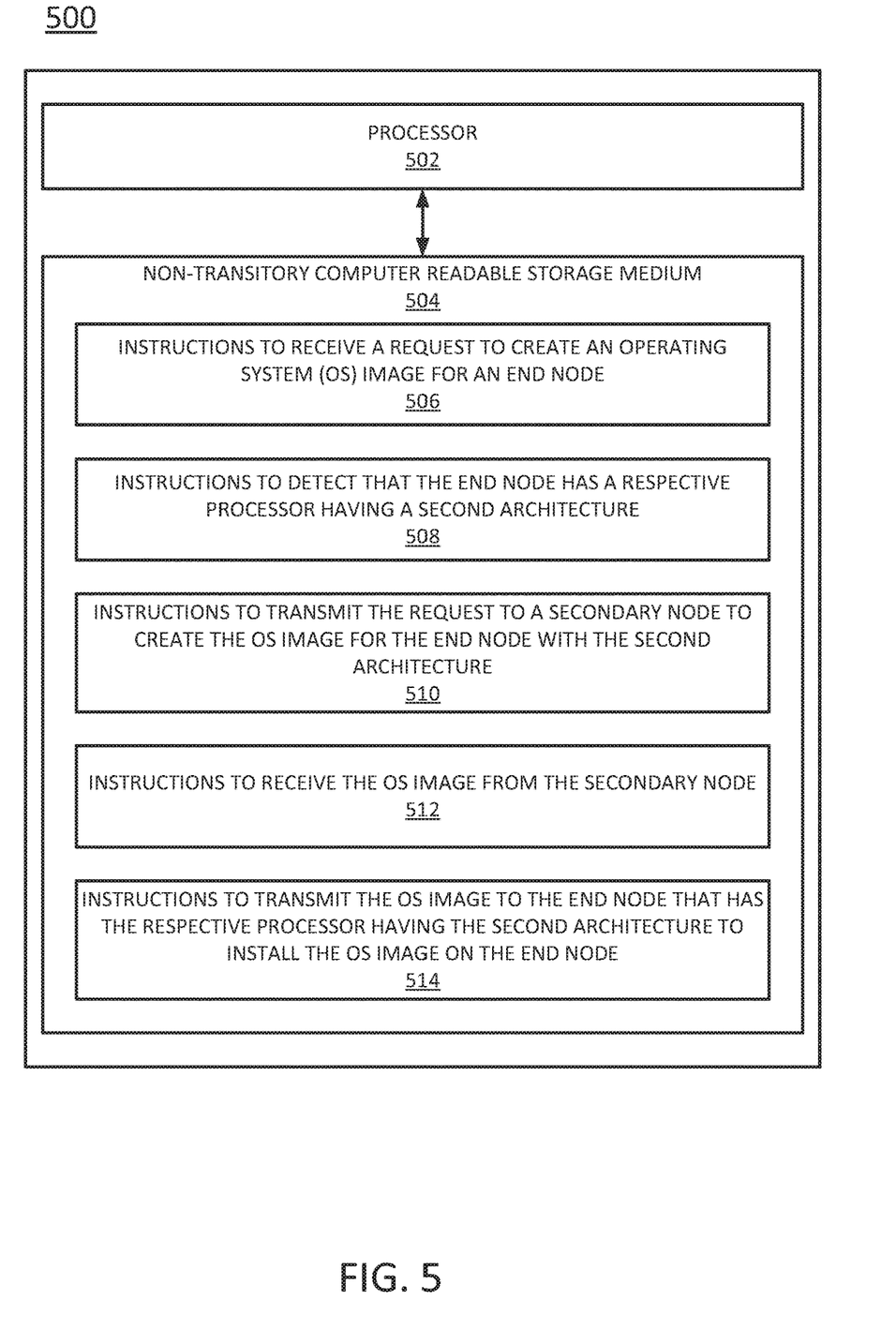
FIG. 5 is a block diagram of an example non-transitory computer readable storage medium storing instructions executed by a processor to create an image.

FIG. 5 illustrates an example of an apparatus 500. In an example, the apparatus 500 may be the head node 102. In an example, the apparatus 500 may include a processor 502 and a non-transitory computer readable storage medium 504. The non-transitory computer readable storage medium 504 may include instructions 506, 508, 510, and 512 that, when executed by the processor 502, cause the processor 502 to perform various functions.

In an example, the instructions 506 may include instructions to receive a request to create an operating system (OS) image for an end node. The instructions 508 may include instructions to detect that the end node has a respective processor having a second architecture. The instructions 510 may include instructions to transmit the request to a secondary node to create the OS image for the end node with the second architecture. The instructions 512 may include instructions to receive the OS image from the secondary node. The instructions 514 may include instructions to transmit the OS image to the end node that has the respective processor having the second architecture to install the OS image on the end node.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

The invention claimed is:

1. A first node comprising:
a processor having a first architecture; and
a non-transitory storage medium storing instructions executable on the processor to:
in response to a first request to create a first operating system (OS) image for a first end node:
determine whether an architecture of the first end node matches the first architecture of the processor of the first node, and
in response to determining that the architecture of the first end node matches the first architecture of the processor of the first node, create the first OS image for the first end node, and cause deployment of the first OS image at the first end node; and
in response to a second request to create a second OS image for a second end node;
determine whether an architecture of the second end node is different from the first architecture of the processor of the first node, and
in response to determining that the architecture of the second end node is different from the first architecture of the processor of the first node, send a command to a secondary node with a processor having the architecture of the second end node to cause creation of the second OS image, receive the second OS image created by the secondary node responsive to the command, and cause deployment of the second OS image at the second end node.

2. The first node of claim 1, further comprising:
a communication interface to establish a communication session with the secondary node.

3. The first node of claim 2, wherein the instructions are executable on the processor to receive the second OS image from the secondary node in the communication session.

4. The first node of claim 1, wherein the first architecture comprises an x86 architecture.

5. The first node of claim 1, wherein the architecture of the second end node comprises an aarch64 architecture.

6. The first node of claim 1, wherein the instructions are executable on the processor to store the first OS image and the second OS image in an OS image repository.

7. The first node of claim 1, wherein the first and second end nodes are isolated from the secondary node.

8. The first node of claim 1, wherein the instructions are executable on the processor to:
present a user interface; and
receive the first request and the second request through the user interface.

9. The first node of claim 8, wherein the second request is incompatible with an OS of the first node, and is compatible with an OS of the secondary node.

10. The first node of claim 8, wherein the instructions are executable on the processor to:
translate the second request into the command that has a syntax compatible with an OS of the secondary node.

11. A method, comprising:
receiving, by a head node with a processor having a first architecture, a first request to create a first operating system (OS) image for a first end node having a second architecture;
in response to the first request:
determining, by the head node, whether an architecture of the first end node matches the first architecture of the processor of the head node, and
in response to determining that the architecture of the first end node matches the first architecture of the processor of the head node, creating, by the head node, the first OS image for the first end node, and causing deployment of the first OS image at the first end node; and receiving, by the head node, a second request to create a second OS image for a second end node; and in response to the second request:

determining, by the head node, whether an architecture of the second end node is different from the first architecture of the processor of the head node, and in response to determining that the architecture of the second end node is different from the first architecture of the processor of the head node, sending, by the head node, a command to a secondary node with a processor having the architecture of the second end node to cause creation of the second OS image, receiving, by the head node, the second OS image created by the secondary node responsive to the command, and causing deployment of the second OS image at the second end node.

12. The method of claim 11, further comprising:

storing, by the head node, the first OS image and the second OS image in an OS image repository containing OS images for end nodes of different architectures.

13. The method of claim 11, further comprising:

establishing, by the head node, a communication session with the secondary node; and presenting, by the head node, a graphical user interface (GUI) to receive the first request and the second request.

14. The method of claim 11, further comprising:

receiving, by the head node, a further request to update the second OS image for the second end node;

sending, by the head node to the secondary node, a command to update the second OS image with a package;

receiving, by the head node, an updated OS image from the secondary node; and synchronizing, by the head node, the updated OS image with an OS image stored in an OS image repository.

15. The method of claim 11, wherein the command comprises a container command or a change root command.

16. The method of claim 11, wherein the determining of whether the architecture of the first end node matches the first architecture of the processor of the head node comprises:

analyzing, by the head node, the first request to determine an architecture associated with the first request.

17. The method of claim 11, wherein the first architecture and the architecture of the second end node are different processor architectures.

18. A non-transitory computer readable storage medium instructions that upon execution cause a head node having a first processor architecture to:

receive a first request to create a first operating system (OS) image for a first end node;

in response to the first request:

determine whether a processor architecture of the first end node matches the first processor architecture of the head node, and in response to determining that the processor architecture of the first end node matches the first processor architecture of the head node, create the first OS image for the first end node, and cause deployment of the first OS image at the first end node;

receive a second request to create a second OS image for a second end node; and in response to the second request:

determine whether a processor architecture of the second end node is different from the first processor architecture of the head node, and in response to determining that the processor architecture of the second end node is different from the first processor architecture of the head node, send a command to a secondary node with a processor architecture that is the same as the processor architecture of the second end node to cause creation of the second OS image, receive the second OS image created by the secondary node responsive to the command, and cause deployment of the second OS image at the second end node.

19. The non-transitory computer readable storage medium of claim 18, wherein the first OS image comprises a copy of executable files of an OS executable by a processor of the first processor architecture.

20. The non-transitory computer readable storage medium of claim 19, wherein the executable files comprise a tree of directories for the OS.

21. The non-transitory computer readable storage medium of claim 18, further comprising instructions that upon execution cause the head node to:

establish a communication session with the secondary node in response to determining that the processor architecture of the second end node is different from the first processor architecture of the head node.

* * * * *